United States Patent [19]

Nichols et al.

[11] Patent Number: 5,064,365

[45] Date of Patent: Nov. 12, 1991

[54] MOLD APPARATUS WITH MOLD BREAKER

[75] Inventors: Lawrence R. Nichols, Dover, N.H.; Terry M. Yuill, North Berwick, Me.

[73] Assignee: Davidson Textron Inc., Dover, N.H.

[21] Appl. No.: 551,294

[22] Filed: Jul. 12, 1990

[51] Int. Cl.⁵ .............................................. B29C 45/42
[52] U.S. Cl. .................. 425/436 R; 249/66.1; 249/68; 425/441; 425/444
[58] Field of Search ............................ 249/66.1, 67, 68; 264/334; 425/436 R, 436 RM, 441–444

[56] References Cited

U.S. PATENT DOCUMENTS

| | | | |
|---|---|---|---|
| 858,812 | 7/1907 | Johns | 249/68 |
| 1,544,316 | 6/1925 | Hazeltine | 425/436 RM |
| 2,030,726 | 2/1936 | Strock et al. | 249/68 |
| 3,363,040 | 1/1968 | Aoki | 249/68 |
| 3,398,781 | 8/1968 | Bevis | 249/68 |
| 3,548,451 | 12/1970 | Carmi et al. | 425/4 R |
| 3,624,672 | 11/1971 | Spivy | 425/817 R |
| 4,118,168 | 10/1978 | Rees et al. | 249/68 |

Primary Examiner—Jay H. Woo
Assistant Examiner—James P. Mackey
Attorney, Agent, or Firm—John C. Evans

[57] ABSTRACT

A mold apparatus for forming parts by reacting foam precursors in a mold cavity part closed by a cover has a mold breaker assembly including a member for holding a molded foam product in the mold cavity part as the cover is removed for part demolding. The member defines a slide for movement of the cover with respect to the mold cavity part to break adhesion of the cover from the top of the molded part while the molded part is firmly held in the mold cavity part. The mold breaker assembly includes a lift handle on the cover which is used to open the cover once the adhesive forces are broken so as to expose the molded part for demolding without scraping against the mold cavity part.

3 Claims, 2 Drawing Sheets

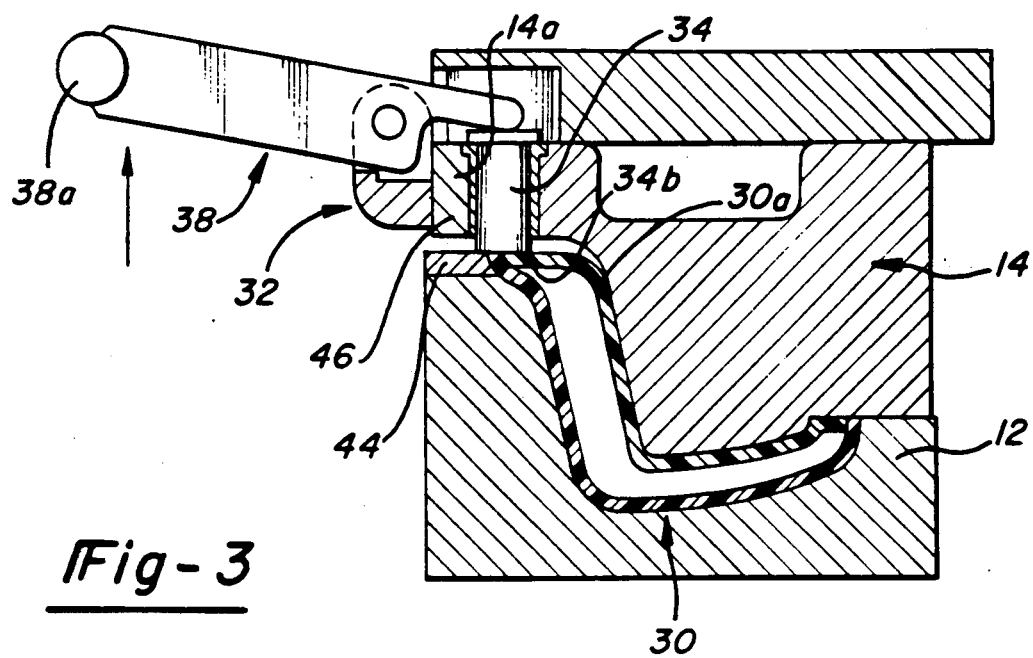
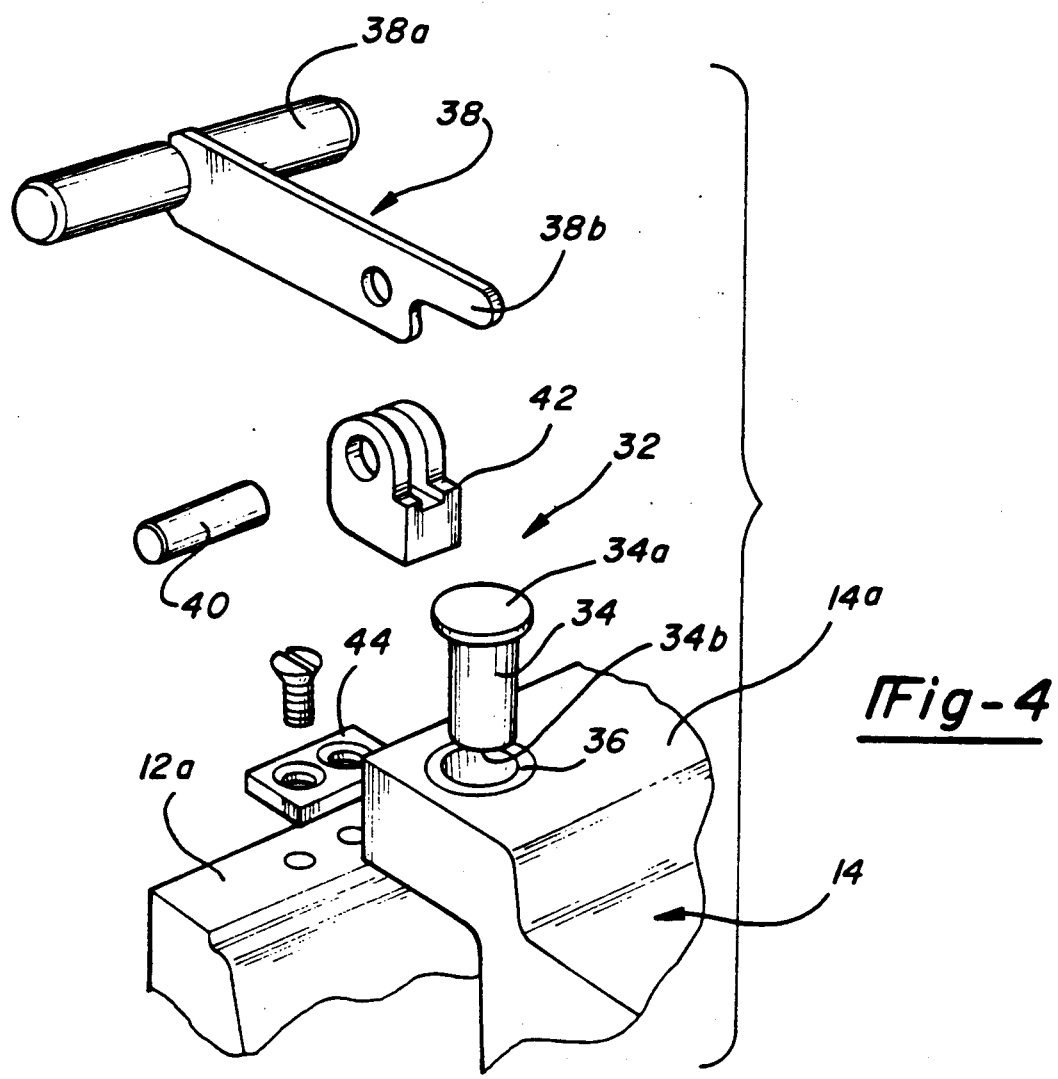

MOLD APPARATUS WITH MOLD BREAKER

FIELD OF THE INVENTION

This invention relates to mold apparatus for molding foam parts having a mold cavity part closed by a cover to define a space for reaction of foam precursors which cause adhesion of the top of the molded part to the cover during the molding process, and more particularly, to molded breaker assemblies in such apparatus.

BACKGROUND OF THE INVENTION

Mold apparatus for forming urethane foam parts includes a mold cavity part and a cover as shown in anyone of U.S. Pat. Nos. 3,680,629; 4,734,230; 4,793,784. While such apparatus is suitable for its intended purpose, certain formulations of foam precursors can cause a reaction in which the top surface of the molded part is adhered to the cover by a bond force which is sufficient to cause the molded part to be lifted with the cove when it is removed to demold the part from the mold cavity part. U.S. Pat. Nos. 3,548,451 and 3,624,672 show molds for forming foam material. They do not disclose mold breakers which hold a part in a mold base as adhesion is broken between the molded part and a mold cover.

If the molded part remains connected to the cover it can scrape against the mold cavity part as the cover is removed so as to cause damage to the molded part resulting in undesirable scrap.

In order to prevent such damage, in prior mold apparatus of the type shown in the aforesaid patents, the person demolding the part had to hand hold the molded part in the mold cavity part as the cover was opened. Such manual mold breaking slows down the molding operation in an undesirable manner.

SUMMARY OF THE INVENTION

Accordingly, one feature of the present invention is the provision of a mold apparatus having a mold breaker assembly which is operative to hold a molded foam product in a mold cavity part as a mold cover is removed therefrom prior to part demolding.

Another feature of the present invention is to provide mold apparatus for molding foam parts in which a mold cover can be separated from the upper surface of the molded foam part by breaking adhesive forces between the upper surface of the foam part and the cover prior to removal of the cover from the mold apparatus in preparation for demolding of the part from the mold apparatus.

Still another feature of the present invention is to provide such mold apparatus characterized by a mold breaker assembly formed wholly on the cover and operative to both hold a molded part in the base of the mold apparatus and break the adhesive force between the molded part and the cover prior to opening of the cover so as to prevent the molded part from being carried by the cover as it is removed from the base of the mold apparatus.

An object of the present invention is to provide for separation of a cover of foam mold apparatus from a base of the apparatus following formation of a molded foam part without the molded part being adhered to the cover during the demolding process.

A further object of the present invention is to provide a mold apparatus in which a molded foam part will be firmly held in position in a foam tool mold base while a mold cover is removed from the base and to provide for such retention by a mold breaker assembly for breaking adhesion between the cover and the upper surface of the molded part while simultaneously holding the molded part in the mold apparatus base.

A further object of the present invention is to provide such mold apparatus further characterized by a mold breaker assembly having a member holding the molded part in position in a mold cavity part while releasing the cover from the mold cavity part by breaking of the adhesion between the top surface of the formed part and the cover.

A still further object of the present invention is to provide such mold apparatus further characterized by mold cover lift handle mounted on the cover including a member for applying a separation force between the cover and the mold cavity part to break adhesion between the upper surface of the foamed part while holding the molded part in a mold cavity part on the base; and wherein the mold cover lift handle further includes a handle grip for removing the cover from the molded part following breaking of adhesion between the top of the molded part so as to permit the cover to be removed from the mold cavity part without hand-retaining the molded part formed therein.

Still another object of the present invention is to provide mold apparatus of the aforesaid type characterized by the mold lift means including a lift handle pivotally supported to said cover and including a grip end and a pry end; the grip end defining a point for manually lifting the cover from the mold cavity part and the pry end having an at rest position during part molding and further having an actuated position wherein a force is applied to the mold cavity part for separating the cover therefrom.

Yet another object of the present invention is to provide mold apparatus of the aforesaid type characterized by the mold lift means including a breaker pin supported for reciprocation in the cover and having a head portion raised from the upper surface of the cover and a base surface located in engagement with the mold cavity part; and a pivotal handle provided for moving the cover relative to the head portion for tilting the cover with respect to the mold cavity part while the base surface retains the foamed part against separation from the mold cavity part.

Another object of the present invention is to provide the aforesaid mold apparatus further characterized by the mold lift means including a mold lift handle and a breaker pin; the breaker pin slideably supported in the cover to cause the cover to be free to tilt upwardly from the mold cavity part during part demolding when a release force is applied between the cover and the mold cavity part; and the mold lift handle and the breaker pin cooperating to apply a release force between the cover and the mold cavity part.

Various other objects, features and attendant advantages of the present invention will be more fully appreciated as the same become better understood from the following detailed description when considered in conjunction with the accompanying drawings in which:

BRIEF DESCRIPTION OF THE DRAWINGS

FIG. 3 is a sectional view of the mold apparatus of FIG. 1 shown in a partially released position; and FIG. 4 is a perspective view of the mold breaker components use to position the mold apparatus in the partially released position of FIG. 3.

DETAILED DESCRIPTION OF THE PREFERRED EMBODIMENT

Figure 1:
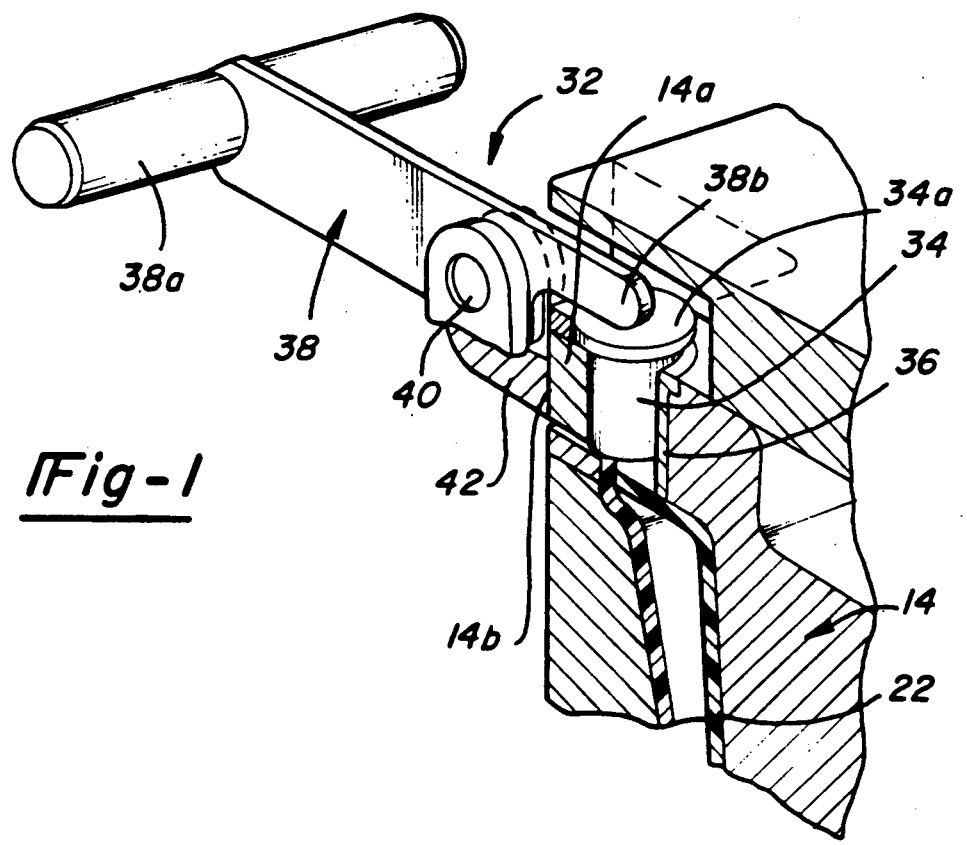
FIG. 1 is a fragmentary perspective view, partially sectioned on mold apparatus including the present invention.
Figure 2:
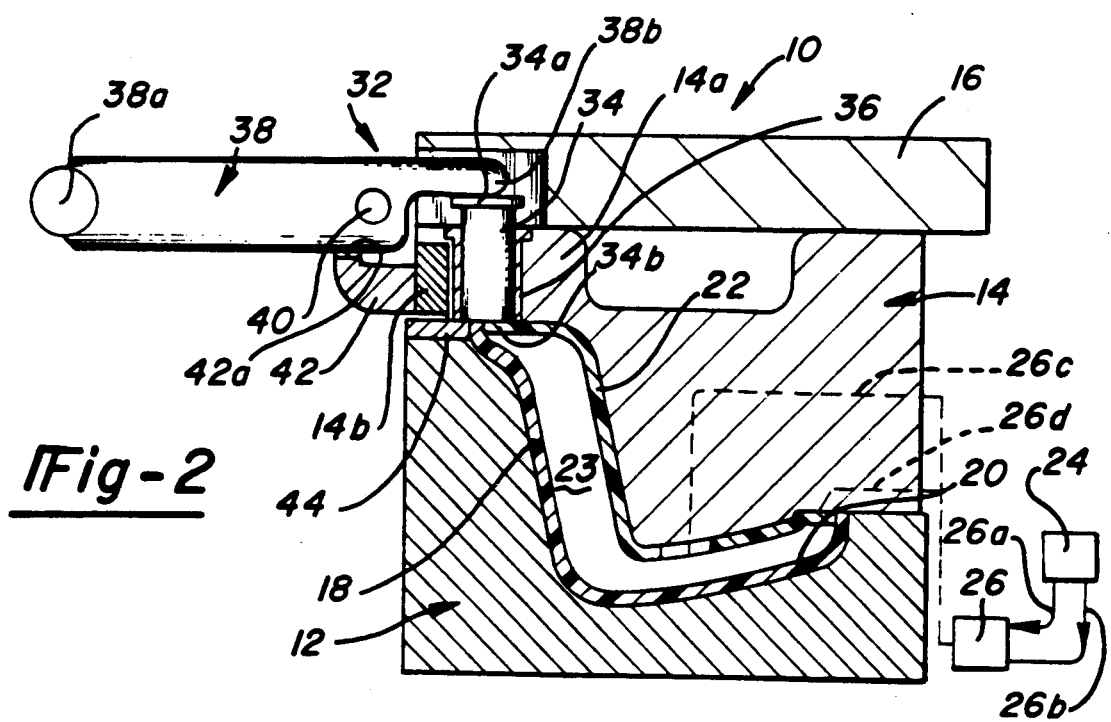
FIG. 2 is a sectional view of the mold apparatus of FIG. 1.

Referring now to FIG. 2 a mold apparatus 10 is illustrated including a mold base or mold cavity part 12 supporting a cover 14. The cover 14 is shown as a single part cover with it being recognized that other cover arrangements are contemplated within the scope of the present invention including those in which the cover 14 is a secondary cover that in turn carries a primary cover 16 of the type that is clamped to the base 12 during the molding process.

The mold apparatus is the type which can be preloaded with a vinyl shell or skin 18 on the inner surface 20 of the mold cavity part as shown in FIG. 2. In such arrangements an insert 22 can be carried on the cover 14. A space 23 formed between the insert 22 and the shell or skin 18 is connected to a suitable source 24 of foam precursors including a head 26 for directing a prepolymer stream 26a and a catalyst stream 26b into the space 23 where they react to form a layer of foam bonded to both the skin 18 and the insert 22. The head 26 directs the foam either through the cover(s) 14, 16, and through an opening in the insert as shown by dotted line path 26c, or alternatively, through the parting line 26d between the covers.

The resultant part can be used for armrests, consoles, crash pads, instrument panels and other automotive interior trim parts such as door panels and the like. In each case a suitable urethane quasi-prepolymer system is used in which a prepolymer and activator are mixed in the head 26 and directed into the space 23 for reaction to form a foam backing for the shell 18 and a bonded foam layer on the inset 22. The chemistry of the foam system can be selected from any of the known systems of this type including those set-forth in U.S. Pat. Nos. 3,555,130; 3,575,896 and 3,681,291 all assigned to the assignee of the present invention. Such systems are representative of any number of other systems available for the manufacture of foam material used in automotive interior trim products or for other products such as bedding, furniture and the like.

In the manufacture of such products one problem is that of removing the finished product 30 from the mold cavity as shown in FIG. 3. In particular, it is found that many foam formulations will cause the cover 14 to adhere to the upper surface 30a of the finished product 30 such that the mold operator is required to manually separate the cover 14 from the finished part 30 while holding the finished product in the base or mold cavity part 12. Such manual manipulation and hold down unnecessarily complicates the manufacturing process.

The present invention contemplates an improved mold breaker 32 which is operative to break the adhesion between the finished part 30 and the cover 14 while holding the finished part 30 in the mold cavity part 12 during the breaking of adhesion and to do so without requiring the operator to hand hold the finished part in place in the mold cavity part 12. As a consequence, the finished product will not be carried on the cover so as to be damaged by scraping against the mold base.

In accordance with the present invention these objectives are accomplished by a mold breaker assembly 32 having a breaker pin 34 supported in a bushing 36 mounted in one edge 14a of the cover 14. The breaker pin 34 and the bushing are arranged for relative sliding movement therebetween and serve to define a slide for movement of the cover 14 upwardly from the upper surface 30a of the finished product 30 when the mold apparatus is initially broken following completion of the foam mold process.

The breaker pin 34 has an enlarged head portion 34a which is spaced upwardly from the bushing 36 when the mold is closed as shown in FIG. 2. The breaker pin 34 is activated by a lift handle 38 having a cross-handle 38a on one end and a pry end 38b on the opposite end. The lift handle 38 is pivotally connected to the cover 14 by a pivot pin 40 directed through a bifurcated reaction member 42 that is fastened to the outer edge surface 14b of the cover 14. A stop surface 42a is provided on the member 42 to limit the travel of handle 38.

Another aspect of the invention is that the breaker pin 34 has a flat inboard surface 34b that overlies a wear plate 44 secured by screws to the upper edge surface 12a of the mold cavity part 12. The wear plate 44 only covers part of the diameter of the inboard surface 34b such that a segment of the breaker pin 34 will contact the upper surface 30a of the finished part during mold breaking so as to hold the finished product 30 in the mold until the cover 14 can be lifted from the base without carrying the product 30 from the base or mold cavity part 12.

As shown in FIG. 2, during molding the lift handle 38 is located in a horizontal position in which the pry end 38b is disposed in a notched side-hole in the primary cover 16. The surface 34b rests on the wear plate 44 and the breaker pin head portion 34a is located above the upper surface of the bushing 36. This relationship enables the cover 14 to be located in overlying juxtaposed position with an insert 22 if it is desired to provide an insert in the finished product 30. The invention of course is equally suitable for use with products which foam directly against the cover 14 and have no intervening insert. The provision of an insert is included in those products which utilize the insert for mounting the part, for example, in the case of armrests the insert can be a mounting plate.

The cover 14 can be a secondary cover which is initially pivotally closed against the mold base. Thereafter a primary cover 16 can be pivoted closed and clamped to the base by known means to close the mold during the foaming process.

Once the part is molded the primary cover 16 is opened and the lift handle 38 is raised as shown in FIG. 3. The pry end 38b will bear against the head portion 34a to maintain the breaker pin 34 against the wear plate 44 and also against the upper surface 30a of the finished part to hold it in place. A breaking moment 46 is then imposed on the cover 14 at the outer edge 14a thereof to cause the cover to lift from the upper surface 30a so as to break adhesion forces between the cover 14 and the finished product 30. Such forces are of a magnitude which might otherwise tend to lift the finished part from the base 12. However, the hold down action of the breaker pin and the lift action of the handle 38 are more than adequate to separate the cover 14 from the finished part and enable the cover 14 to be pivoted open without disturbing the finished part.

A further feature of the invention is that the handle 38 can be used to lift the cover 14 from the rest of the mold apparatus 10 once the finished part 30 is no longer adhered to the cover 14.

Accordingly, the cover 14 will be completely out of the way such that the finished part 30 can be easily lifted from the base without damage.

The industrial applicability of the mold breaker assembly of the present invention is to the manufacture of any foam molded part in which a finished part must be retained in a mold base until all the mold covers have been removed from the base.

Although the invention has been described in accordance with a single embodiment of the apparatus, it will be readily apparent to those skilled in the art that numerous modifications and variations can be made within the scope and spirit of the invention as defined in the attached claims.

What is claimed is:

1. Mold apparatus for forming a molded foam part, the apparatus including a mold cavity means for molding the molded foam part and a cover which is held against a top of the molded foam part during molding to close the mold cavity means and further comprising:

mold breaker means mounted on said cover for applying a separation force between said cover and the mold cavity means to break adhesion between the top of the molded foam part while holding the molded foam part in the mold cavity means;

said mold breaker means including a breaking pin movably supported in said cover and having a head portion raised from an upper surface of said cover and a base surface portion located in engagement with said mold cavity means, and a lift handle pivotally supported on said cover for contacting and depressing said breaking pin in said cover to tilt said cover with respect to said mold cavity means and for removing said cover from the top of the molded foam part following breaking of adhesion between the top of the molded foam part and the cover so as to permit the cover to be removed from the mold cavity means without carrying the molded foam part thereon, said lift handle including a grip end and a pry end, said grip end for manually lifting said cover from said mold cavity means and said grip end extending to said pry end adjacent said head portion of said breaking pin, said pry end having an at rest position during part molding and further having an actuated position wherein a force is applied by said pry end against the head portion of said breaking pin, whereby the breaking pin is depressed in the cover to engage and apply a force to the molded foam part in said mold cavity means for separating said cover from the molded foam part as said cover is removed from said mold cavity means.

2. Mold apparatus for forming a molded foam part, the apparatus including a mold cavity means for molding the molded foam part and a cover which is held against a top of the molded foam part during molding to close the mold cavity means, and further comprising:

mold breaker means mounted on said cover for applying a separation force between said cover and the top of the molded foam part while holding the molded foam part in the mold cavity means;

said mold breaker means including a breaking pin movably supported in said cover and having a head portion raised from an upper surface of said cover and a base surface portion located in engagement with said mold cavity means, and a lift handle pivotally supported on said cover for depressing said breaking pin in said cover and removing said cover from the top of the molded foam part following breaking of adhesion between the top of the molded foam part and the cover so as to permit the cover to be removed from the mold cavity means without carrying the molded foam part thereon;

said lift handle including a grip end for manually lifting said cover from said mold cavity means and a pry end adjacent said head portion of said breaking pin, said pry end pivoting between an at rest position during part molding and an actuated position wherein a force is applied by said pry end against the head portion of said breaking pin, whereby the braking pin is depressed in said cover to engage and apply a force to the molded foam part in said mold cavity means for separating said cover from the molded foam part as said cover is removed from said mold cavity means;

said mold breaker means further including a reaction member connected to the cover for receiving and pivotally securing said lift handle to the cover to allow said pry end to pivot between said at rest position and said actuated position, and a pivot pin extending through said lift handle and said reaction member for pivotally securing said lift handle to said reaction member.

3. Mold apparatus for forming a molded foam part, the apparatus including a old cavity means for molding the molded foam part and a cover which is held against a top of the molded foam part during molding to close the mold cavity means, and further comprising:

mold breaker means mounted on said cover for applying a separation force between said cover and the top of the molded foam part while holding the molded foam part in the mold cavity means;

said mold breaker means including a breaking pin movably supported in said cover and having a head portion raised from an upper surface of said cover and a base surface portion located in engagement with said mold cavity means, and a lift handle pivotally supported on said cover for depressing said breaking pin in said cover and removing said cover from the top of the molded foam part following breaking of adhesion between the top of the molded foam part and the cover so as to permit the cover to be removed from the molded cavity means without carrying the molded foam part thereon;

said lift handle including a grip end for manually lifting said cover from said mold cavity means and a pry end adjacent said head portion of said breaking pin, said pry end pivoting between an at rest position during part molding and an actuated position wherein a force is applied by said pry end against the head portion of said breaking pin, whereby the breaking pin is depressed in said cover to engage and apply a force to the molded foam part in said mold cavity means for separating said cover from the molded foam part as said cover is removed from said mold cavity means;

said mold breaker means further including a wear plate secured to the mold cavity means adjacent said molded foam part such that said base surface portion of said breaking pin contacts and extends over a portion of said wear plate and said molded foam part.

* * * * *